United States Patent [19]

Huang et al.

[11] Patent Number: 5,406,370
[45] Date of Patent: Apr. 11, 1995

[54] WINDING TECHNIQUE FOR DECREASING THE PUMP POWER REQUIREMENT OF A BRILLOUIN FIBER OPTIC GYROSCOPE

[75] Inventors: Shangyuan Huang, Willowdale, Canada; Byoung Y. Kim, Seoul, Rep. of Korea; Hebert J. Shaw, Stanford; Keiichiro Toyama, Los Altos, both of Calif.

[73] Assignee: The Board of Trustees of the Leland Stanford University, Stanford, Calif.

[21] Appl. No.: 25,327

[22] Filed: Feb. 26, 1993

[51] Int. Cl.6 .............................. G01C 19/64
[52] U.S. Cl. ................................. 356/350
[58] Field of Search ............... 356/350; 372/94

[56] References Cited

U.S. PATENT DOCUMENTS 4,530,097  7/1985  Stokes et al. ............... 356/350
5,074,665  12/1991  Huang et al. ............... 356/350

OTHER PUBLICATIONS

P. Bayvel, et al., "Evaluation Of Performance Parameters Of Single–Mode All–Fiber Brillouin Ring Lasers", *Optics Letters*, vol. 14, No. 11, Jun. 1, 1989, pp. 581–583.
L. F. Stokes, et al., "All–Single–Mode Fiber Resonator", *Optics Letters*, vol. 7, No. 6, Jun. 1982, pp. 288–290.
L. F. Stokes, et al., "All–fiber Stimulated Brillouin Ring Laser With Submilliwatt Pump Threshold", *Optics Letters*, vol. 7, No. 10, Oct. 1982, pp. 509–511.
A. L. Schawlow, et al., "Infrared And Optical Masers", *Physical Review*, vol. 112, No. 6, Dec. 15, 1958, pp. 1940–1949.
F. Zarinetchi, et al., "Stimulated Brillouin Fiber–Optic Laser Gyroscope", *Optics Letters*, vol. 16, No. 4, Feb. 15, 1991, pp. 229|231.
W. W. Chow, et al., "The Ring Laser Gyro", *Reviews of Modern Physics*, vol. 57, No. 1, Jan. 1985, pp. 61–104.
E. J. Post, "Sagnac Effect", *Reviews of Modern Physics*, vol. 39, No. 2, Apr. 1967, pp. 475, 493.
P. J. Thomas, et al., "Possibility Of Using An Optical Fiber Brillouin Ring Laser For Inertial Sensing", *Applied Optics*, vol. 19, No. 12, Jun. 15, 1980, pp. 1906–1908.
W. Bernard, et al., "Fundamentals Of A Fiber Integrated Brillouin Ring Laser Gyro", *Symposium Gyro Technology*, Stuttgart, Germany, 1991, pp. 12.0–12.20.
P. K. Kadiwar, et al., "Optical Fiber Brillouin Ring Laser Gyroscope", *Electronics Letters*, vol. 25, No. 25, 7th Dec., 1989, pp. 1729–1731.

*Primary Examiner*—Samuel A. Turner
*Attorney, Agent, or Firm*—Knobbe, Martens, Olson & Bear

[57] ABSTRACT

A Brillouin fiber optic gyroscope has a cavity loop that includes a first length of optical fiber wound as a first number of turns in a first direction to provide a selected system response that includes the dynamic range of gyroscope rotation rate, the resolution of the gyroscope rotation rate measurement, the relative lock-in range and the relative Kerr-effect-induced beat-frequency bias. The cavity loop further includes a second length of optical fiber wound as a second number of turns in the same direction as the first number of turns and wound as a third number of turns in an opposite direction to the winding direction of the first and second number of turns. The effect of the second and third number of turns is to increase the overall length of the optical fiber in the cavity loop to reduce the pump power required to generate Brillouin laser light within the cavity loop without increasing the Sagnac effect within the cavity loop. Thus, the system response that includes the dynamic range of gyroscope rotation rate, the resolution of the gyroscope rotation rate measurement, the relative lock-in range and the relative Kerr-effect-induced beat-frequency bias of gyroscope rotation rate, is not substantially affected by the increased number of turns provided by the second length of optical fiber.

16 Claims, 4 Drawing Sheets

WINDING TECHNIQUE FOR DECREASING THE PUMP POWER REQUIREMENT OF A BRILLOUIN FIBER OPTIC GYROSCOPE

BACKGROUND OF THE INVENTION

1. Field of the Invention

The present invention relates generally to Brillouin Fiber Optic Gyroscopes and more particularly, to an apparatus and method of decreasing the pump power requirement of a Brillouin Fiber Optic Gyroscope.

2. Description of the Prior Art

It is generally desirable to be able to decrease the input power requirement of any given system without affecting other system performance. Such a feature is especially desirable in a Brillouin Fiber Optic Gyroscope (BFOG), due to the large expense involved in supplying pump power, even in the milliwatt range.

At typical resonator cavity lengths of less than 100 meters, resulting in negligible fiber attenuation loss, the required pump power of a BFOG is inversely proportional to the length of the resonator coil. Under these conditions, it is feasible to reduce the input pump power by increasing the resonator coil length. However, other crucial system parameters are also dependent on resonator coil length, and a change in the resonator coil length will correspondingly impact other system performance. The most important of these resonator coil-length-dependent parameters are the dynamic range of gyroscope rotation rate, the resolution of the rotation rate measurement, the relative lock-in range, and the relative Kerr-effect-induced beat-frequency bias.

As described and claimed in U.S. Pat. No. 4,530,097, entitled "Brillouin Ring Laser," assigned to the assignee of the present invention, a BFOG comprises a laser source which provides pump light into a fiber. A directional coupler splits the pump light into two portions. The two portions are coupled into a resonator with one traveling in the clockwise (CW) direction and the other in the counterclockwise (CCW) direction in the resonator. The length of the resonator is adjusted so that the pump frequency matches one of the longitudinal modes in the resonator. When the pump power exceeds the threshold level for Brillouin oscillation, Brillouin waves will start propagating, resulting in bi-directional laser oscillations.

When the resonant cavity loop is at rest, both Brillouin waves will have the same resonant frequency. Upon rotation of the loop, each of the counterpropagating Brillouin waves will have a different optical path length around the loop due to the Sagnac effect because the optical path length for one of the waves increases, while the optical path length for the other wave decreases.

For instance, when the loop is rotated in a CW direction, the CW-traveling Brillouin wave will have a longer optical path around the loop than the CCW-traveling Brillouin wave. This difference in optical path length causes the resonant frequency for each wave to downshift or upshift accordingly, resulting in a frequency difference between the CCW and CW Brillouin waves. When the counterpropagating Brillouin waves are combined at the output, a beat-frequency is obtained. This beat-frequency is proportional to the rotation rate.

In a typical BFOG, the length of the resonator is adjusted through an asymmetrical feedback system so that one of the cavity resonant modes, for example, the CW cavity resonant mode, coincides with the pump frequency. When the gyro is not rotating, the CCW pump light is also resonant because the CCW and CW cavity resonant modes coincide with each other. However, once the gyro rotates, the CCW and CW cavity resonant modes split and the CCW pump light is no longer at the resonant peak center. This results in a lower CCW pump intensity and accordingly, a lower CW Brillouin intensity.

This phenomenon, known as the "resonant walk-off effect," restricts the dynamic range of gyroscope rotation rate of the gyro. The pump waves in a BFOG can resonate in the cavity only if the pump frequency falls within the resonance frequency peak. Therefore, the width of this resonance peak, $\Delta f_c$, will directly affect the dynamic range of gyroscope rotation rate of the gyro. As the rotation rate of the gyro increases, the CCW pump intensity continues to decrease and eventually becomes too low to sustain a CW Brillouin wave. When this happens, the beat signal disappears, and the rotation rate cannot be measured. This phenomenon sets the limit for the maximum rotation rate of the gyroscope, that is, the dynamic range of the gyroscope rotation rate is limited.

There are multiple thresholds for different orders of Brillouin lasing in a BFOG. When the pump intensity reaches the first threshold for Brillouin stimulated scattering, the circulating pump power within the resonant cavity is pinned. Any additional pump input power above this pinned level is built up as the first-order Brillouin circulating power.

When the first circulating Brillouin power reaches the same level as the circulating pump power, the second-order Brillouin circulating wave is generated. The operating window between the first-order Brillouin threshold and the second-order Brillouin threshold is referred to as the first operating window of the BFOG.

If the gyroscope is operating at the maximum limit of the first window (i.e., the input pump power is just below the second-order Brillouin threshold), the maximum allowed separation of resonator mode frequencies seen by the CW and CCW pump waves is $\pm[(\sqrt{3})(\Delta f_c/2)]$, where $\Delta f_c$ is the full width of the pump resonance peak at half maximum. This occurs where the CW pump is stabilized at the resonant peak center and the corresponding CCW pump is operating at the minimum intensity needed to sustain the generation of a Brillouin wave, which is one-quarter of the CW pump intensity. Therefore, the dynamic range of the gyroscope rotation rate or the maximum rotation rate of the BFOG $\Omega_{MAX}$, corresponding to the maximum allowed frequency separation of the CW and the CCW resonant modes is:

$$\Omega_{MAX} = \frac{\sqrt{3}}{2} (\Delta f_c/S) \tag{1}$$

where S is the scale factor of the BFOG. The scale factor is the Brillouin beat-frequency obtained under unit rotation rate. It is expressed by the formula:

$$S = \frac{4A}{n\lambda L} \tag{2}$$

where A is the total effective sensing area of the gyro, L is the total cavity length, n is the refractive index of the fiber, and λ is the wavelength of the light.

Since A is proportional to L, S is independent of L. However, $\Delta f_c$ is inversely proportional to L. Thus, an increase in L in the conventional manner will result in a corresponding decrease in the maximum rotation rate (i.e., the dynamic range of the rotation rate) of the gyroscope.

Accordingly, one of the goals of the present invention is to increase the coil length without reducing the maximum rotation rate (i.e., the dynamic range of the rotation rate) of the gyroscope.

The second system parameter affected by an increase in resonator coil length is the resolution of the gyroscope rotation rate measurement. The resolution of the gyroscope rotation rate measurement is limited by the linewidth of the Brillouin beat signal at the gyroscope output, and the latter is determined by the linewidth of the individual Brillouin lasing waves. A lasing wave has a particular linewidth, and this is the result of spontaneous emission noise which introduces incoherent energy to the oscillation mode. The linewidth of the lasing wave is much narrower than the cold cavity resonance linewidth, and its theoretical limit can be expressed by the Schawlow-Townes formula:

$$\Delta f_{ST} = 2\pi h \nu \frac{(\Delta f_c)^2}{P_{s,out}} \quad (3)$$

where h is Planck's constant, $\nu$ is the light frequency and $P_{s,out}$ is the Brillouin laser output power.

The resolution of the rotation rate measurement of the BFOG is governed by the formula:

$$\delta \Omega = \frac{\Delta f_{ST}}{S} \quad (4)$$

where $\Delta f_{ST}$ is the Schawlow-Townes linewidth and S is the scale factor. At typical resonator cavity lengths of less than 100 meters, fiber attenuation loss is negligible. Under these conditions, $\Delta f_{ST}$ is inversely proportional to L. Thus, an increase in L in the conventional manner will imply a decrease in $\delta \Omega$. This is a desirable factor in any BFOG system.

Accordingly, a second goal of the present invention is to reduce the input pump power of a BFOG while either increasing the resolution of the rotation rate measurement (i.e., reducing $\delta \Omega$), or keeping it invariant, as a trade-off for keeping the dynamic range of the BFOG rotation rate invariant.

The third system parameter affected by an increase in resonator coil length is the lock-in range of the gyro. Optical coupling between the counterpropagating waves tends to pull the frequencies of these two Brillouin waves together. When the frequency difference of the counter propagating lasing waves decreases to a point, typically less than 500 Hz, the two Brillouin waves are locked into one frequency. This limits the minimum of the rotation rate of the gyro.

Since the absolute frequency lock-in range is inversely proportional to L, increasing L will result in a decrease in the lock-in range. Although this is also desirable, the absolute frequency lock-in range does not provide any meaningful determination of gyro performance. To be able to make that determination, the absolute lock-in range should be scaled to provide the ratio of the lock-in range to the total operational range. As previously discussed, the scaling factor is independent of L, and thus, an increase in L in the conventional manner will reduce the relative lock-in range, which is desirable in a BFOG system.

Thus, a third goal in the present invention is to decrease input pump power while either reducing the relative lock-in range of the BFOG system, or leaving the relative lock-in range invariant, as a trade-off for keeping the dynamic range of the BFOG rotation rate invariant.

The final system parameter of significance is the Kerr-effect-induced beat-frequency bias. The "resonant walk-off-effect" described above causes the two Brillouin waves in the cavity to have different circulating power levels when the gyro is rotating. This results in a beat-frequency bias through a phenomenon known as the "Kerr-effect." Basically, as the Brillouin waves travel through the optical fiber, the refractive index seen by a Brillouin signal is slightly modified by the signal's own intensity, as well as by other light intensities circulating inside the resonator. When the circulating intensities of the CW and CCW Brillouin signals are different or not balanced, the imbalance causes an effective difference in the optical path lengths of the cavity seen by these two waves. This imbalance of the Brillouin intensities and the resultant optical path length imbalance translates to a beat-frequency offset, sometimes known as the Kerr-bias which appears as a non-zero rotation rate even though the BFOG may not be rotating. This results in a spurious reading for the rotation rate measurement.

Since the Kerr-bias is proportional to the differential circulating power between the two Brillouin waves, it is proportional to the absolute Brillouin circulating power in the first window, $P_{S,cir}$. As $P_{S,cir}$ is inversely proportional to L, assuming negligible fiber attenuation loss, it follows that the absolute Kerr-bias is reduced with an increase in L.

Again, the determination of gyro performance is described by the relative Kerr bias instead of the absolute Kerr bias. Thus, a determination of the Kerr-bias is again obtained through scaling. As discussed above, the scale factor is independent of L, so that increasing L in the conventional manner will lead to a decrease in the Kerr-bias. Thus, a fourth goal in the present invention is to reduce input pump power while either reducing the relative Kerr-effect-induced beat-frequency bias, or keeping it invariant, as a trade-off for keeping the dynamic range of the BFOG invariant.

Accordingly, there is a need in the art for a technique of reducing pump power requirement in a BFOG that does not degrade other system performance, particularly the important system parameters of: the dynamic range of the gyroscope rotation rate, the resolution of BFOG rotation rate measurement, the relative lock-in range and the relative Kerr-effect-induced beat-frequency bias.

SUMMARY OF THE INVENTION

One aspect of the present invention is a fiber optic coil for a Sagnac effect sensor. The coil has both clockwise and counterclockwise windings. The windings are arranged to cause partial cancellation of the Sagnac effect on light propagating through the coil. The number of clockwise windings is different from the number of counterclockwise windings so that the Sagnac effect is not completely canceled. Light propagating through the coil is responsive to the Sagnac effect in proportion to the difference between the number of clockwise windings and the number of counterclockwise windings.

Another aspect of the present invention is a method of operating a Sagnac effect sensor having a fiber optic coil. The method comprises the steps of propagating light through the coil and utilizing the Sagnac effect to alter a characteristic of the light as the light propagates through the coil. The method further utilizes the Sagnac effect to oppositely alter the characteristic of the light as the light propagates through the coil, such that a portion of the other alteration is canceled. Preferably, the propagating step comprises propagating light in both directions through the coil, and the method additionally comprises the step of rotating the coil to provide a frequency difference between the counterpropagating waves. Also preferably, the propagating step comprises propagating light having an intensity sufficient to produce Brillouin scattering in the fiber optic coil. Preferably, the coil comprises a first plurality of turns of optical fiber wound in a first direction and a second plurality of turns of optical fiber wound in a second direction, The second plurality is a different number from the first plurality such that the Sagnac effect is partially canceled.

Another aspect of the present invention is a method for use with a Brillouin fiber optic gyroscope having a detector, a loop of optical fiber configured for exposure to an ambient effect along substantially the entire length of said loop, and a pump source. Pump light from the pump source is split into two pump waves which are introduced to the coil as two counterpropagating pump light waves. The pump light waves in the coil generate a pair of counterpropagating Brillouin waves for sensing an ambient effect. A portion of each Brillouin wave is coupled from the coil, and the two portions are combined to form an output signal which varies in response to the ambient effect. The detector detects this output signal. The method in accordance with this aspect of the invention reduces pump power requirements for the sensor. The method comprises the steps of determining a first loop length which will provide a desired response of the output signal to the ambient effect; utilizing a fiber having a second loop length longer than the first length to permit the Brillouin waves to be generated at reduced pump power; and configuring the longer loop length fiber to provide the desired response at a reduced pump power. In the described embodiment, the ambient effect is rotation. In one embodiment, the response corresponds to the dynamic range of gyroscope rotation rate. In another embodiment, the response corresponds to the resolution of gyroscope rotation rate measurement. In yet another embodiment, the response corresponds to the relative lock-in range. In another embodiment, the response corresponds to the relative Kerr-effect-induced beat-frequency bias. Preferably, the configuring step comprises winding the fiber in a loop that comprises a first plurality of turns of the fiber having the first loop length wound in a first direction to provide the desired response, and also comprises a second plurality of turns and a third plurality of turns having a total loop length equal to a difference between the first loop length and the second loop length. One of the second and third plurality of turns is wound in the first direction, and the other of the second and third plurality of turns is wound in a second direction opposite the first direction to suppress changes in the desired response.

Another aspect of the present invention is a Brillouin fiber optic gyroscope comprising a pump source that generates pump light. A first length of an optical fiber is wound in a first direction to provide a first plurality of turns of a loop formed as a Brillouin laser cavity. The optical fiber receives the pump light as a pair of counterpropagating pump signals in the loop. The counterpropagating pump signals causes a pair of laser light signals to be generated within the loop as a result of Brillouin scattering. A detector detects the output Brillouin wave produced by the stimulated Brillouin laser waves that exit from the loop. The detected signal indicates the frequency difference between the two counterpropagating Brillouin waves in accordance with the Sagnac effect caused by rotation of the loop. The gyroscope has a system response which includes a dynamic range of gyroscope rotation rate, a resolution of gyroscope rotation rate measurement, a relative lock-in range, and a relative Kerr-effect-induced beat frequency bias associated with the rotation of said loop. A second length of the optical fiber is formed in the loop to increase the length of the optical fiber in the loop to thereby reduce the power required from the pump source to generate the Brillouin laser waves. The second length of fiber comprises a second plurality of turns wound in the first direction and a third plurality of turns wound in a second direction opposite the first direction. Preferably, the second plurality of turns and the third plurality of turns are substantially equal.

Another aspect of the present invention is a method of winding a loop to reduce the pump power requirements for a Brillouin optical fiber gyroscope. The method comprises the steps of winding a first plurality of turns of an optical fiber in a first direction to form the loop and to establish a desired system response of the gyroscope, which includes the dynamic range of the gyroscope rotation rate, the resolution of the rotation rate measurements, the relative lock-in range and the relative Kerr-effect-induced beat-frequency bias. The method further includes the step of winding a second plurality of turns of the optical fiber in the first direction to increase the length of the optical fiber in the loop and to thereby reduce the pump power requirements for generating Brillouin laser light in the loop. The second plurality of turns further increase the Sagnac effect within the loop. The method also includes the step of winding a third plurality of turns of the optical fiber in a second direction opposite the first direction to further increase the length of the optical fiber in the loop and to thereby further reduce the pump power requirements for generating Brillouin laser light in the loop. The third plurality of turns of the optical fiber have the further effect of at least partially canceling out the increase in the Sagnac effect of the loop caused by the second plurality of turns, thereby suppressing any changes in the system response of the gyroscope.

One further aspect of the present invention is a method of winding a Sagnac loop to reduce the pump power requirements for a Brillouin optical fiber gyroscope. The method comprises the step of winding a first plurality of turns of an optical fiber in a first direction to form the loop and to establish a desired system response for the gyroscope, which include the dynamic range of the gyroscope rotation rate, the resolution of rotation rate measurement, the relative lock-in range, and the relative Kerr-effect-induced beat frequency bias, in accordance with a Sagnac effect within the loop encompassed by the first plurality of turns. The method comprises the further step of winding a second plurality of turns of the optical fiber in the first direction and a third plurality of turns of the optical fiber in a second direction opposite the first direction to increase the length of the optical fiber in the loop and to thereby reduce the pump power requirements for generating Brillouin laser light in the loop without increasing the Sagnac effect within the loop.

DETAILED DESCRIPTION OF THE PREFERRED EMBODIMENT

The theory of operation of the present invention will be first presented, followed by a description of the physical structure and operation of the embodiments of the present invention.

The Brillouin laser of the present invention utilizes a fiber optic resonator, described in U.S. Pat. No. 4,389,090, entitled "Fiber Optic Resonator", and operates as a Brillouin ring laser as described in U.S. Pat. No. 4,530,097, entitled "Brillouin Ring Laser." Both patents are assigned to the assignee of the present invention and both patents are incorporated by reference herein.

Figure 1:
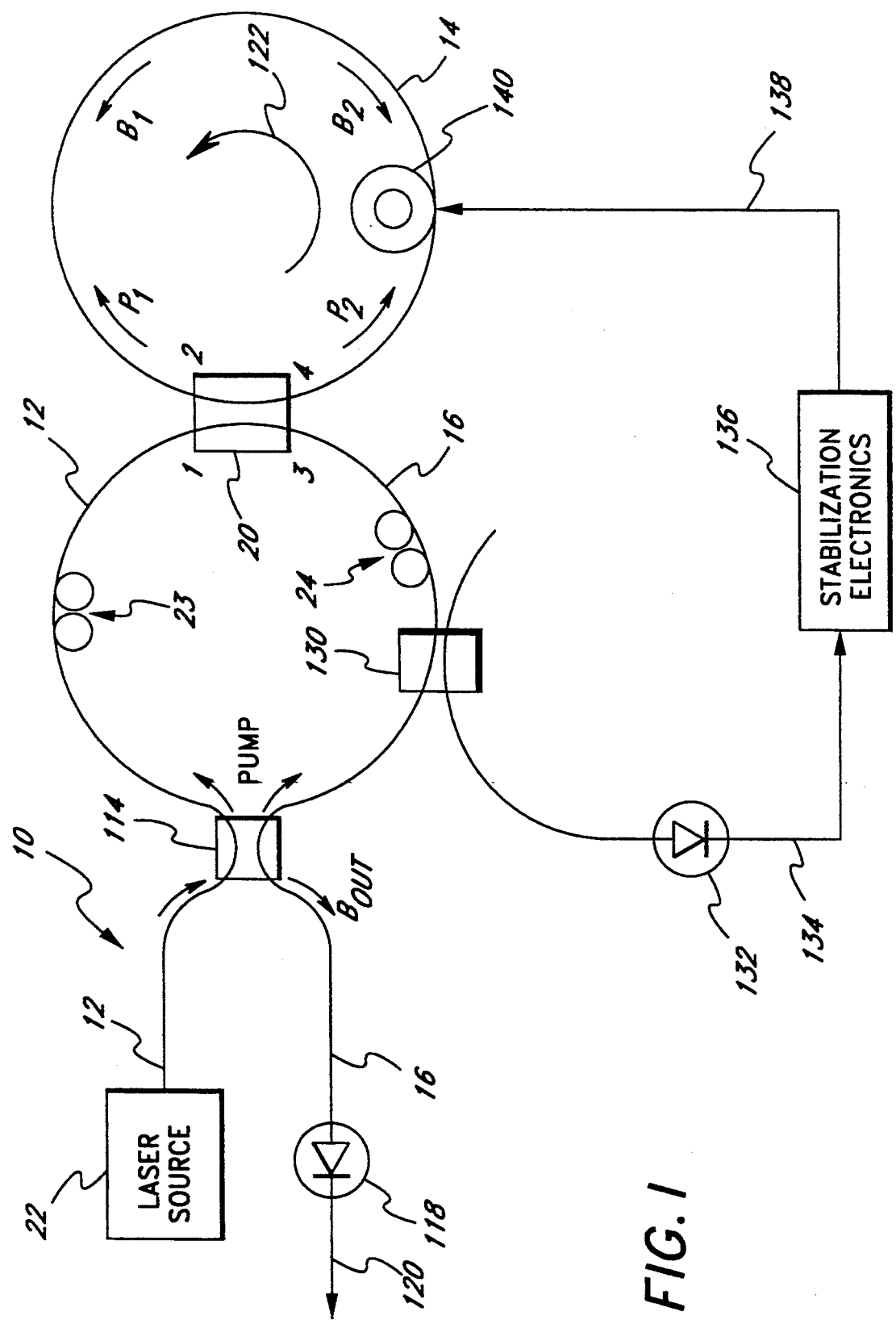
FIG. 1 illustrates a Brillouin optical fiber gyroscope (BFOG) into which the present invention is incorporated.

As shown in FIG. 1, the BFOG of the present invention comprises a first strand 10 of single mode optical fiber, having an input end portion 12, a first intermediate portion 13, a second intermediate portion 15, and an output end portion 16. The BFOG further includes a second strand 14 of single mode optical fiber that forms a loop 14. The first intermediate portion 13 and the second intermediate portion 15 of the first fiber 10 are optically coupled to the loop 14 by means of a fiber optic, four-port directional coupler 20 having ports 1 and 2 on one side thereof, and having ports 3 and 4 on the other side thereof. An example of such a coupler 20 is the fused-type coupler. The coupler 20 has a coupling coefficient of a few percent (for example, three percent).

With reference to FIG. 1, light introduced from a laser source 22 into the portion 12 is split through the coupler 114 into the intermediate portions 13, 15. The light from the intermediate portion 13 propagates to the port 1 of the coupler 20, where a portion of the light (e.g., a few percent) is coupled to the port 4, with the remaining portion propagating to the port 3. The light at the port 3 propagates through the intermediate portion 15 and and is coupled out through the coupler 114. However, light at the port 4 traverses the fiber loop 14 and again enters the coupler 20 at the port 2, where a portion is coupled to the port 3 while the remaining propagates to the port 4, and thus propagates back into the fiber loop 14.

Similarly, light introduced into the intermediate portion 15 propagates to port 3 of the coupler 20, where a portion of the light is coupled to port 2, with the remaining portion propagating into the port 1. The light at the port 1 propagates through the intermediate portion 13 and is coupled out through the coupler 114. The light at the port 2 traverses the fiber loop 14 and again enters the coupler 20 at port 4, where a portion is coupled to port 1 while the remaining propagates to the port 2 and thus propagates back into the fiber loop 14.

As described in more detail in U.S. Pat. No. 4,530,097, the loop 14 and the coupler 20 cooperate to provide a resonant cavity so that light entering the coupler 20 at the port 2 interferes with incoming light from the laser source 22. Such interference is constructive at the port 4, while being destructive at the port 3, thereby causing light to build up in the resonant cavity loop 14. Similarly, light entering the coupler 20 at the port 4 interferes with incoming light from the laser source 22. Such interference is again constructive at the port 2, while being destructive at the port 1.

The fiber portions 12, 16, are passed through a fiber optic fused-type directional coupler 114. The coupler 114 is similar to the coupler 20. The coupling constant of the coupler 114 is set at 0.5 so that approximately 50% of the light propagating through one of the fiber portions 12 will be coupled to the intermediate fiber portions 13, 15. The laser source 22 is optically coupled to introduce light into the input end portion 12, while a detector 118 is optically coupled to receive light from the end of the output end portion 16.

As the pump light introduced into the input end portion 12 from the laser source 22 travels through the coupler 114, it is divided into two substantially equal portions so that approximately one-half of the pump power is in each of the intermediate portion 13 and the intermediate portion 15 when the light reaches the coupler 20. At the coupler 20, pump light is introduced into the fiber loop 14, from the port 3 to the port 2, as well as from the port 1 to the port 4, to provide two counterpropagating pump light waves P1 and P2. Because the loop 14 forms a resonant cavity, the pump light waves P1 and P2 will each build up to a maximum circulating power. Assuming the circulating pump power is above the threshold level for Brillouin oscillation, a portion of the pump energy of each of the waves P1, P2 will be converted into counterpropagating Brillouin waves B1 and B2. Thus, the wave B1 propagates in a direction opposite that of the wave P1, and the wave B2 propagates in a direction opposite to that of the wave P2.

At full resonance, the circulating pump light at the ports 2 and 4 interferes with incoming pump light at the ports 1 and 3, respectively, so that virtually all of the pump light remains in the loop 14 and the pump light output at the ports 1 and 4 is zero. In contrast, the stimulated Brillouin waves B1 and B2 do not interfere significantly with the incoming pump light (since it is at a substantially different frequency from the pump light); and thus,la small fraction of Brillouin light will exit the coupler 20 as it passes therethrough. For example, a fractional amount of the Brillouin wave B1 couples from the port 2 to the port 3 of the coupler 20 for propagation through the intermediate portion 15, while a fractional amount of the wave B2 couples from the port 4 to the port 1 for propagation through the intermediate portion 13. These fractional portions of the waves B1, B2 are combined by the coupler 114 into a Brillouin output wave $B_{out}$ for propagation to the detector 118 via the output end portion 16.

The detector 118 outputs a current $I_{det}$ on the line 120, which is proportional to the intensity of light impinging thereon. Thus, the detector current $I_{det}$ will be proportional to the intensity of $I_B$ of the Brillouin output wave $B_{out}$. The detected intensity of the Brillouin output wave may be expressed as:

$$I_{Bout} = I_{B1} + I_{B2} + 2\sqrt{I_{B1}I_{B2}}\cos 2\pi(f_{B1} - f_{B2})t \tag{5}$$

where $I_{B1}$ is the intensity of the output portion of the Brillouin wave B1, $I_{B2}$ is the intensity of the output portion of the wave B2, $f_{B1}$ is the frequency of the wave B1, $f_{B2}$ is the frequency of the wave B2, and $f_{B1}-f_{B2}$ is the beat-frequency of the output wave $B_{out}$.

At zero rotation rate (i.e., $\delta\Omega$ equals zero), the frequencies of the two Brillouin waves are the same, so that the interference term (i.e., the cosine term) in Equation (5) is one, and thus, the Brillouin wave intensity $I_B$ is a steady state value. However, upon rotation of the loop 14, e.g., in a counterclockwise (CCW) direction, as indicated by the arrow 122, the counterclockwise propagating Brillouin wave B1 will have a longer optical path around the loop 14 than the clockwise propagating Brillouin wave B2 due to the Sagnac effect. This change in optical path length causes the resonant frequency for stimulated Brillouin oscillation to change for each direction of propagation around the loop. Accordingly, the wave B1 will resonate at a downshifted frequency, and the wave B2 will resonate at an upshifted frequency, thereby yielding a frequency difference therebetween. When the waves are combined to form the output Brillouin wave $B_{out}$, such frequency difference causes the Brillouin intensity to periodically vary as a function of the cosine of the frequency difference (i.e., the beat-frequency), as may be seen from Equation (5). Conventional detection electronics (not shown) are connected to receive signals on the line 120 to detect the frequency of these periodic variations in Brillouin intensity, e.g., by detecting zero crossings, in the time domain or by using a Fast Fourier Transform (FFT) spectrum analyzer in the frequency domain.

The intermediate fiber portions 13, 15 also include polarization controllers 23, 24, respectively, to adjust the fiber birefringence in the portions 13, 15, so that circulating light at the ports 2 and 4 has substantially the same polarization as light from the laser source at the ports 1 and 3. The operation of the polarization controller is also described in more detail in U.S. Pat. No. 4,530,097.

A feedback loop, comprising a coupler 130 with a coupling constant of a few percent, connected to the intermediate fiber portion 15 taps a portion of the transmission power of P2 to a photodetector 132. The photodetector 132 outputs a current proportional to the intensity of the tapped power. It is connected to the input of stabilization electronics 136 via a signal line 134. The output of the stabilization electronics 136 is connected via signal line 138 to a PZT cylinder 140 in the loop 14. The stabilization electronics 136 control the diameter of the PZT cylinder 140. The cylinder 140 stretches the fiber 14 in response to voltage on the line 138 to dynamically vary the length of the fiber loop 14. The stabilization electronics 136 thus stabilizes the length of the loop 14 for full resonance at the pump frequency.

THEORY OF OPERATION

Brillouin scattering is a phenomenon that occurs when pump power circulating through a resonant cavity formed by a looped fiber exceeds a threshold level, thereby causing molecules within the fiber to vibrate at an acoustic frequency. This acoustic frequency is a function of the fiber material and the wavelength of the pump light.

The acoustic wave travels through the fiber in the same direction as the pump light. Its presence causes interaction with the circulating pump light, resulting in Brillouin scattering. Basically, light which is backscattered off the acoustic wave constructively interferes to form a Brillouin wave, which counterpropagates relative to the pump light that generates it. As the Brillouin wave circulates through the resonant cavity, a fractional amount of its power will be lost during each circulation, due to the combined losses of fiber transmission loss, coupler insertion loss, splice loss and loss resulting from power exiting the fiber loop. Thus, the effective Brillouin power transmitted during one round trip through the fiber cavity, generally termed "Brillouin transmission" is:

$$\text{Brillouin transmission} = 1 - \text{Combined losses} \tag{6}$$

For sustained Brillouin oscillation to occur, the gain of the laser must at least compensate for the combined losses. Therefore, the threshold condition for sustained Brillouin oscillation is:

$$\text{Brillouin transmission} \times \text{Brillouin gain} = 1 \tag{7}$$

The stimulated Brillouin scattering gain along a fiber of length L is:

$$\text{Brillouin gain} = \exp(g_B P_c L_{eff} A_{eff}) \tag{8}$$

where $g_B$ is the Brillouin gain coefficient, $P_c$ is the circulating pump power, $A_{eff}$ is the effective core area of the fiber, and $L_{eff}$ is the effective gain length. $L_{eff}$ may be expressed by $$L_{eff} = [1 - \exp(-2\alpha_0 L)]/2\alpha_0 \tag{9}$$

where $\alpha_0$ is the amplitude attenuation coefficient of the fiber.

Thus, the stimulated Brillouin wave round trip transmission is:

$$\text{Brillouin transmission} = (1-K)(1-\gamma_0)(1-\gamma_S)\exp(-2\alpha_0 L) \tag{10}$$

where $\gamma_0$ is the coupler insertion loss, $\exp(-2\alpha_0 L)$ is the fiber transmission loss, K is the coupling ratio of the coupler and $\gamma_S$ is the splice loss.

Finally, substituting Equations (8) and (10) into Equation (7) yields:

$$[(1-K)(1-\gamma_0)(1-\gamma_S)\exp(-2\alpha_0 L)]\exp(g_B P_c L_{eff} A_{eff}) = 1 \tag{11}$$

If the length (L) of the fiber loop is relatively small (e.g., less than 100 meters), the quantity $(1-\exp(-2\alpha_0 L))$ may be approximated as $2\alpha_0 L$, and therefore $L_{eff}$ may be approximated as L. Using these approximations, Equation (11) may be solved for the threshold circulating pump power $P_{c,th}$:

$$P_{c,th} = \frac{A_{eff}}{g_B L} \{-\ln[(1-K)(1-\gamma_0)(1-\gamma_S)\exp(-2\alpha_0 L)]\} \quad (12)$$

Since the ratio of the circulating pump power ($P_c$) to the input pump power ($P_i$) is defined by:

$$\frac{P_c}{P_i} = \frac{K(1-\gamma_0)}{[1-\sqrt{(1-K)(1-\gamma_0)(1-\gamma_S)\exp(-2\alpha_0 L)}\,]^2} \quad (13)$$

Substituting Equation (13) into Equation (12) yields the following threshold input pump power $P_{i,th}$:

$$P_{i,th} = \frac{A_{eff}}{g_B L} \frac{[1-\sqrt{(1-K)(1-\gamma_0)(1-\gamma_S)e^{-2\alpha_0 L}}\,]^2}{K(1-\gamma_0)} \{-\ln[(1-K)(1-\gamma_0)(1-\gamma_S)e^{-2\alpha_0 L}]\} \quad (14)$$

Thus, for sustained Brillouin oscillation, the pump power must be equal to or greater than the theoretical threshold defined by Equation (14).

Since $\alpha_0$ is typically a very small number, the factor $2\alpha_0 L$ is generally negligible. For instance, for a fiber attenuation of $2\alpha_0 = 0.00024$ m$^{-1}$ and a fiber length of $L=20$ meters, $[1-\exp(-2\alpha_0 L)]=0.005$, which corresponds to a transmission loss of 0.5% per round trip.

As a result, it can be observed that with a negligible fiber attenuation loss, at typical BFOG resonator cavity lengths of less than 100 meters, $$P_{i,th} \propto \frac{1}{L} \quad (15)$$

Thus, an increase in the resonant cavity loop length decreases the threshold input pump power requirement.

Figure 2:
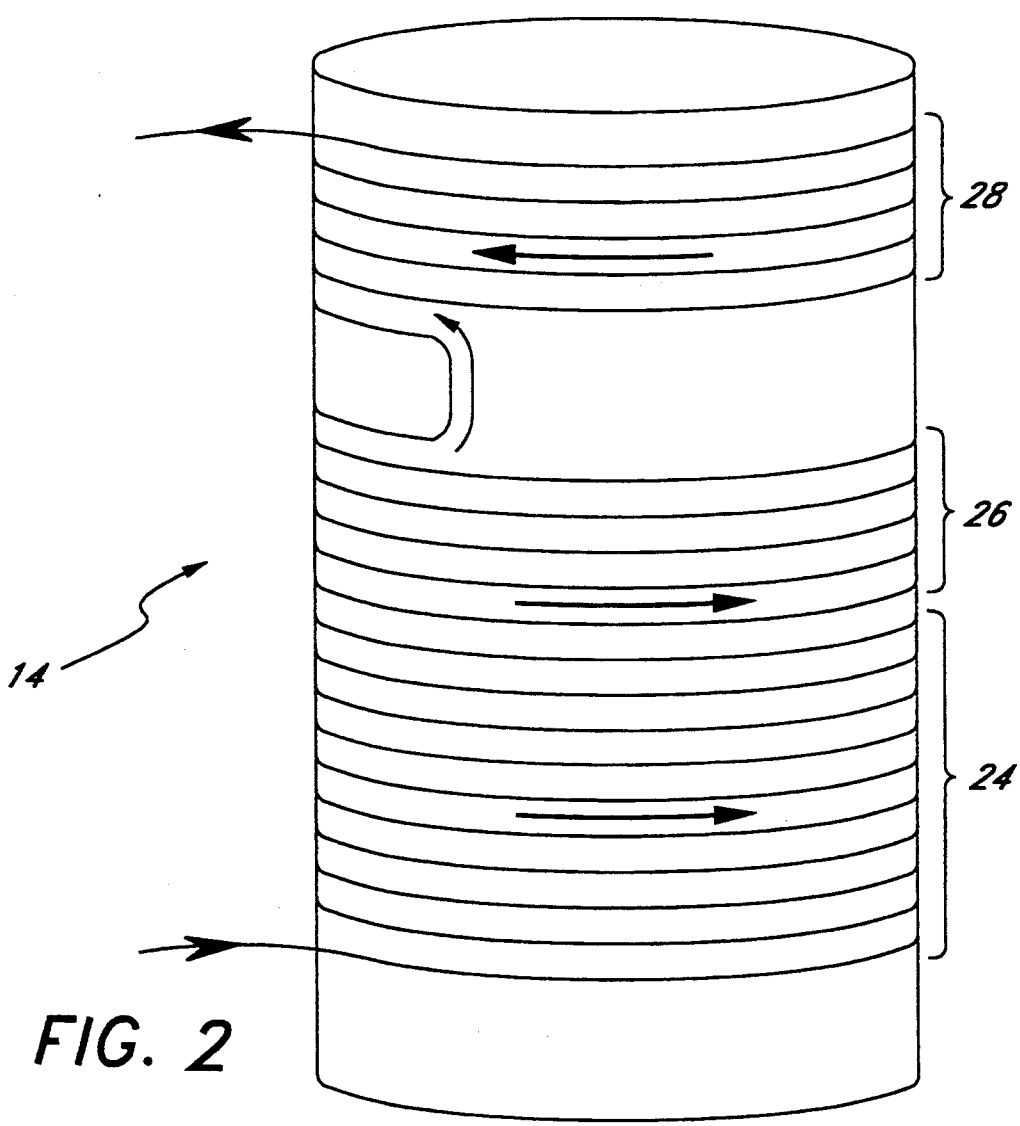
FIG. 2 illustrates the structure of the optical fiber loop of the present invention showing the windings in the first and second directions.

The BFOG of the present invention utilizes this principle in decreasing the pump power requirements of a BFOG. As illustrated in FIGS. 1 and 2, a cavity loop 14 of length L comprises N turns 24 wound in a selected direction (e.g., counterclockwise in FIG. 2). To increase the length L, M turns 26, 28 are added, whereby half of the turns, i.e., M/2 turns 26, are wound in the same direction as the N turns 24 (e.g., counterclockwise in FIG. 2), and the other half, M/2 turns 28, are wound counter to the direction of the N turns (e.g., clockwise in FIG. 2). This technique effectively cancels any additional Sagnac effect on the performance of the BFOG due to the additional M turns, as described below.

Thus, the input pump power requirement can be decreased by the increase of M turns, effectively leaving other system parameters invariant. This will be shown in the following discussion.

The first significant system parameter involved is the maximum rotation rate of the gyro. Upon rotation of the loop about an axis perpendicular to its plane, one of the Brillouin waves is upshifted in frequency, while the other is downshifted, thereby providing a frequency difference ($\Delta f$) therebetween. The rotation rate ($\Omega$) is a function of the frequency difference:

$$\Omega = \frac{\Delta f}{S} \quad (16)$$
$$= \Delta f \frac{n\lambda L}{4A}$$

where $\Delta f$ is the frequency difference, $\lambda$ is the wavelength of the light, n is the refractive index of the fiber, L is the total cavity length, and A is the total effective sensing area of the gyro.

The reason for the frequency shift of the Brillouin waves may be described as follows. Within the Brillouin gain linewidth (i.e., full width at half maximum (FWHM)), a continuum of frequencies is potentially present. However, stimulated Brillouin emission will occur only at the resonant frequencies of the loop 14, since only these frequencies circulate in the loop. Thus, a buildup of Brillouin light will occur in the loop at one of the loop resonant frequencies within the Brillouin gain linewidth. Moreover, among these resonant frequencies of the loop, only that frequency having the highest Brillouin gain will be present, as the Brillouin laser is a homogenous type of laser. When the loop 14 is at rest, both Brillouin waves have the same resonant frequency. This resonant frequency is that nearest to the peak of the Brillouin gain curve.

Upon rotation of the loop 14, each of the counter-propagating Brillouin waves will have a different optical path length around the loop 14, due to the Sagnac effect, the path length for one of the waves increasing, while the path length for the other wave decreasing. This change in path length shifts the cavity resonant frequencies for each of the waves. For the wave propagating in the direction of increased path length, the resonant frequencies are downshifted by an amount $\frac{1}{2}\Delta f(\Omega)$. For the wave propagating in the direction of decreased path length, the resonant frequencies are upshifted by the same amount. Thus, a pair of new Brillouin waves will arise at these shifted resonant frequencies, while the Brillouin waves at thee former resonant frequency will simultaneously diminish because they are no longer resonant in the cavity.

Consequently, during rotation of the loop 14, the Brillouin waves will each have a different frequency, one upshifted from the frequency when the loop is at rest, while the other is downshifted. This process occurs very rapidly so that the frequency of the Brillouin waves is extremely responsive to rotation.

By detecting this frequency difference $\Delta f(\Omega)$, the rotation rate $\Omega$ may be ascertained. This is accomplished by coupling small fractions of the counterpropagating Brillouin waves out of the loop 14, and combining the waves so that they interfere to provide a Brillouin output wave, which sinusoidally varies in intensity at a beat-frequency. The frequency difference $\Delta f$ is equal to the beat-frequency between the two Brillouin output waves. Thus, by detecting the output wave frequency, an indication of rotation rate may be obtained.

Figure 3A:
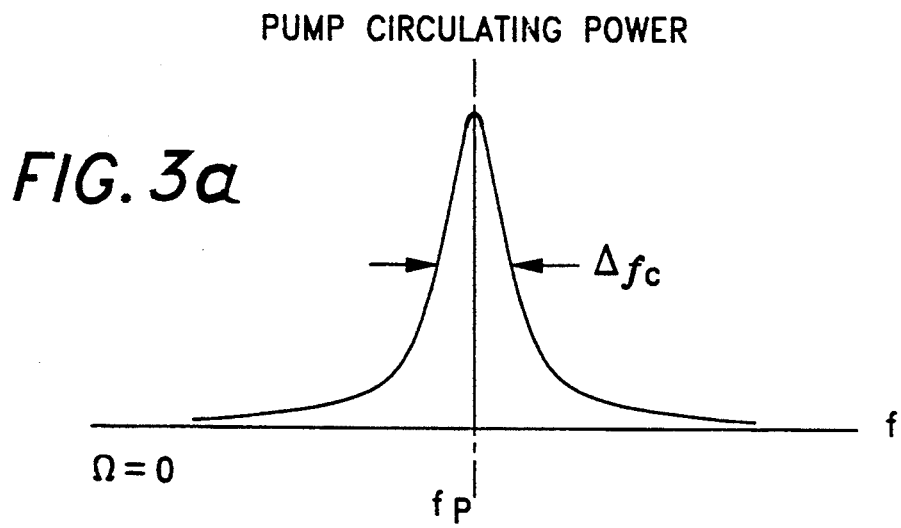
FIGS. 3a, 3b and 3c illustrate the effect of the rotation rate on the separation (i.e., "walk-off") of the cavity resonant frequencies in the two counterpropagating pump waves.
Figure 3B:
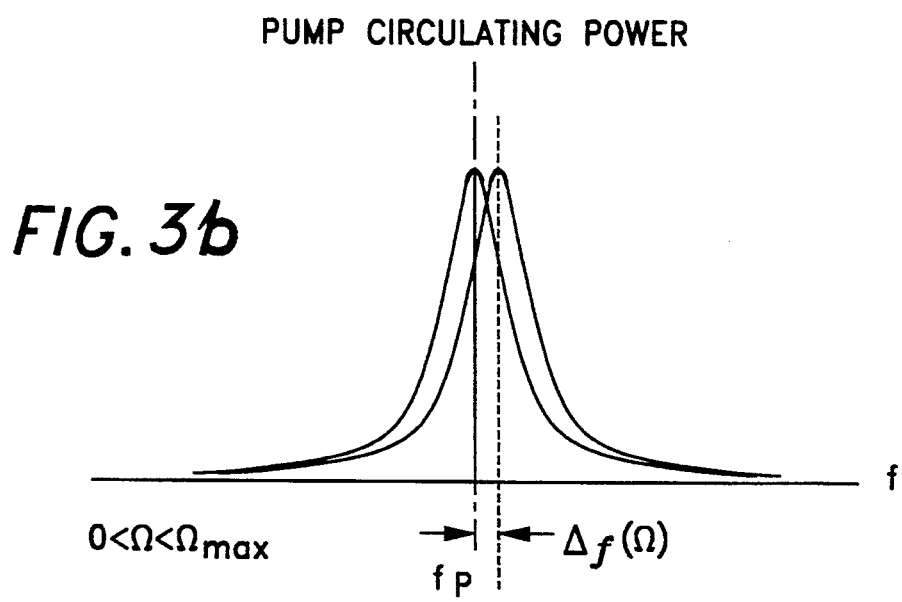
Figure 3C:
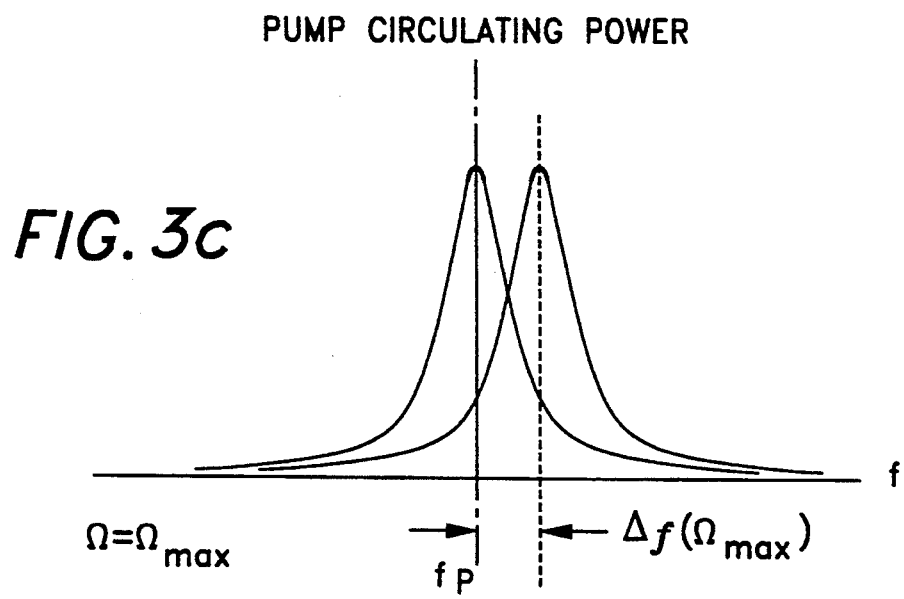

As described earlier, the "resonant walk-off effect" restricts the dynamic range of gyroscope rotation rate of the gyro. The pump waves in a BFOG can resonate in the cavity only if the pump frequency falls within the resonance frequency peak. Referring to FIGS. 3a–3c, if one of the cavity resonant frequencies, e.g., CCW, is locked at pump light frequency $f_p$, the CCW pump wave will always maintain maximum power. However, the CW cavity resonant frequency will "walk away" from the pump frequency $f_P$ upon gyro rotation, and the circulating power of the CW pump wave will diminish. When the circulating power of the CW pump wave falls below the Brillouin threshold, it will no longer be sufficient to cause the generation of Brillouin laser light. The maximum rotation rate that can be detected before this occurs is referred to as $\Omega_{max}$, and the separation between the CW and CCW cavity resonant frequencies is shown in FIG. 3c as $\Delta f(\Omega_{max})$. This limits the maximum rotation rate measurement.

There are multiple thresholds for different orders of Brillouin lasing in a BFOG. When the pump intensity reaches the first threshold for Brillouin stimulated scattering, the circulating pump power within the resonant cavity is pinned. Any additional pump input power above this pinned level is built up as the first-order Brillouin circulating power.

When the first circulating Brillouin power reaches the same level as the circulating pump power, the second-order Brillouin circulating wave is generated. The operating window between the first-order Brillouin threshold and the second-order Brillouin threshold is referred to as the first operating window of the BFOG.

Figure 4:
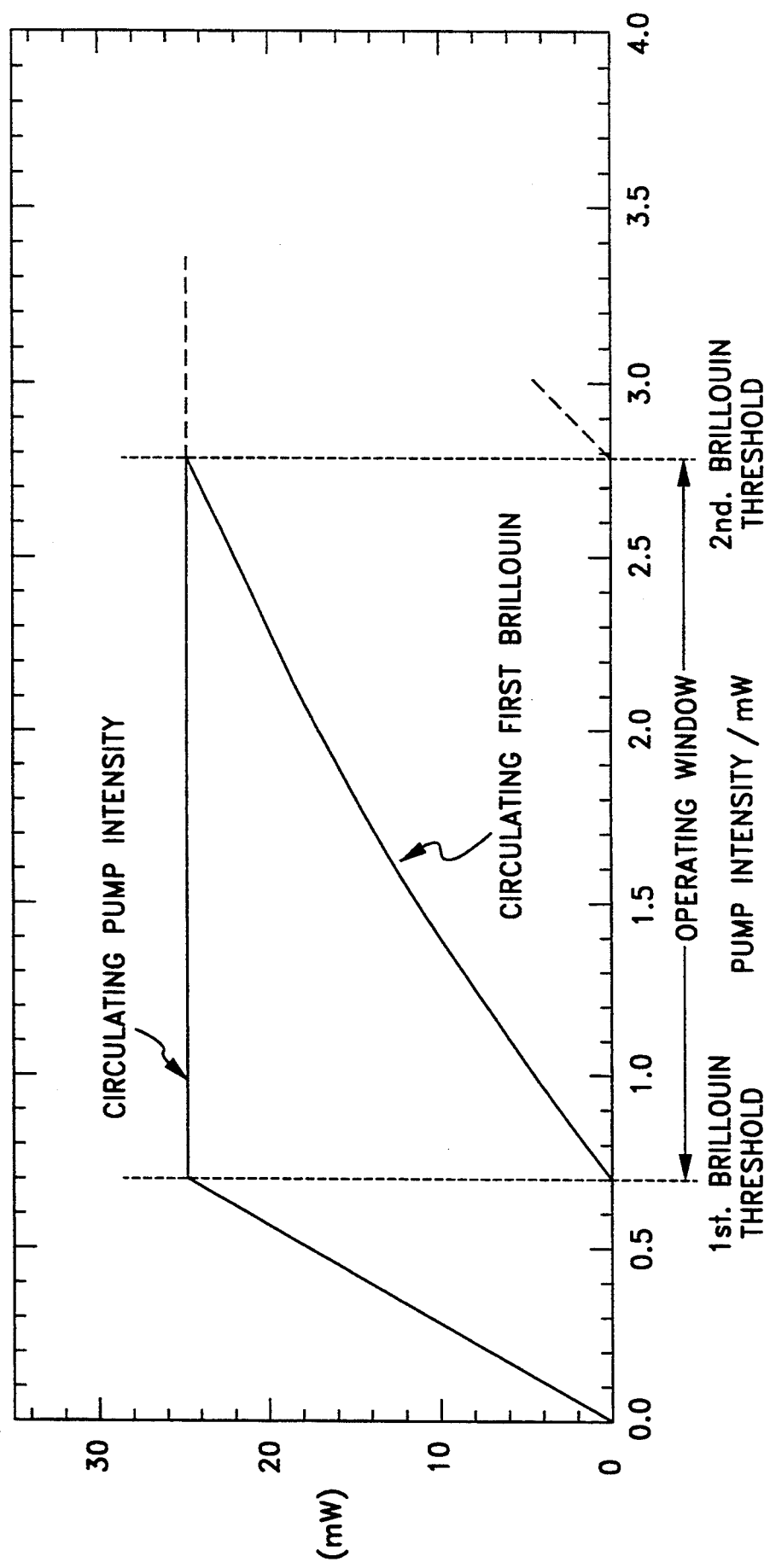
FIG. 4 is a graph of the normalized circulating pump power and Brillouin power versus the normalized pump input power in a resonant optical fiber loop.

When the gyroscope is operating at the upper limit of the first window, i.e., the input pump power is just below the second-order Brillouin threshold, and when asymmetrical stabilization is employed, as illustrated in FIG. 1, the maximum allowed separation of resonator mode frequencies seen by the CW and CCW traveling pump waves is $\pm[(\sqrt{3})(\Delta f_c/2)]$, where $\Delta f_c$ is the full width of one of the signals at half maximum of its respective resonant peak (i.e., FWHM). This maximum allowed separation illustrated in FIG. 3c occurs where the CCW pump is stabilized at resonant peak through asymmetrical stabilization, as illustrated in FIG. 1, and the corresponding CW pump is operating at the threshold for Brillouin scattering, which is 0.25 of the CCW pump power, as shown in FIG. 4.

The maximum rotation rate of the BFOG under these conditions, corresponding to the the maximum allowed frequency separation of the CW and CCW resonant modes is:

$$\Omega_{MAX} = \frac{\sqrt{3}}{2} (\Delta f_c/S) \tag{17}$$

where S is the gyro scale factor.

Figure 5:
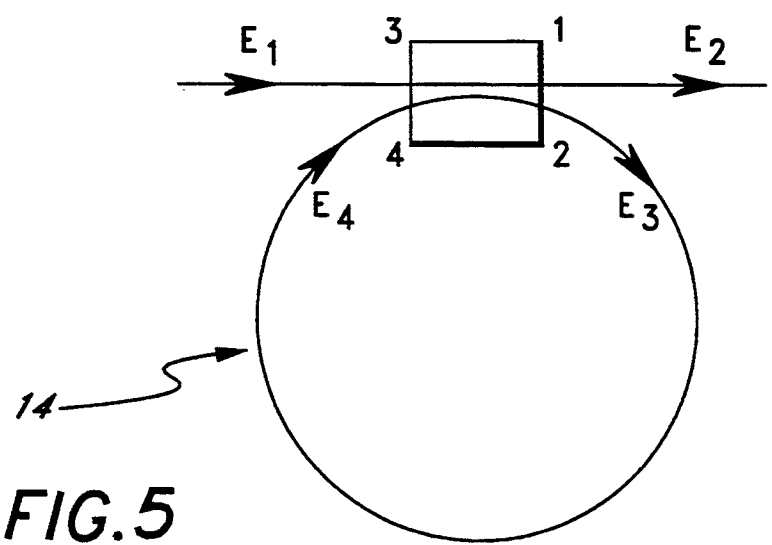
FIG. 5 is a schematic illustration of an optical fiber loop to assist in understanding the electric field amplitudes in the loop.

$\Delta f_c$ can be determined as follows. With reference to FIG. 5, pump power is introduced into both ports 1 and 3 of the coupler 20 to provide counterpropagating Brillouin waves in the loop 14. The complex electric field amplitudes are related to each other by:

$$E_2 = \sqrt{1 - \gamma_0}\ (\sqrt{1 - K}\ E_1 + i\sqrt{K}\ E_4) \tag{18}$$

$$E_3 = \sqrt{1 - \gamma_0}\ (i\sqrt{K}\ E_1 + \sqrt{1 - K}\ E_4)$$

$$E_4 = E_3 \sqrt{1 - \gamma_S}\ e^{-\alpha_0 L + i\beta L}$$

where $E_1$, $E_2$, $E_3$ and $E_4$ are the complex electric field amplitudes at the coupler ports 3, 1, 2 and 4, $\gamma_0$ is the coupler insertion loss, K is the coupling ratio, $\gamma_S$ is the intensity loss of the splice, $\alpha_0$ is the amplitude attenuation coefficient of the fiber, L is the cavity length, and $\beta$ is the propagation constant of the pump wave; and $\beta = n\omega/c$, where n is the fiber refractive index, $\omega$ is the optical frequency, and c is the speed of the light in vacuum. From Equation (18), the following can be obtained:

$$\left|\frac{E_4}{E_1}\right|^2 = \frac{K(1-\gamma_0)(1-\gamma_S)e^{-2\alpha_0 L}}{1+(1-K)(1-\gamma_0)(1-\gamma_S)e^{-2\alpha_0 L} - 2\sqrt{(1-K)(1-\gamma_0)(1-\gamma_S)}\ e^{-\alpha_0 L}\cos\beta L} \tag{19}$$

$$= \frac{K(1-\gamma_0)(1-\gamma_S)e^{-2\alpha_0 L}}{[1-\sqrt{(1-K)(1-\gamma_0)(1-\gamma_S)}\ e^{-\alpha_0 L}]^2 + 4\sqrt{(1-K)(1-\gamma_0)(1-\gamma_S)}\ e^{-\alpha_0 L}\sin^2(\beta L/2)}$$

At resonance, the pump circulating power $|E_r|^2$ (hence $|E_4/E_1|^2$) reaches the maximum. It can be seen from Equation (19) that the cavity resonances correspond to $\beta L = 2\pi n f_q L/c = 2q\pi$ (q is any integer number and refers to the qth resonant mode). Thus:

$$f_q = \frac{c}{nL}\ q \tag{20}$$

The full width at half maximum (FWHM) of the pump resonance, $\Delta f_c$, is found by equating Equation (19) with $\frac{1}{2}\max|E_4/E_1|^2$. Letting $f_{\frac{1}{2},q}$ be the frequency where the circulating power reaches half its maximum value for the qth resonance by inserting $\beta L = 2\pi n f_{\frac{1}{2},q} L/c$ into Equation (19), the following is obtained:

$$\frac{K(1-\gamma_0)(1-\gamma_S)e^{-2\alpha_0 L}}{[1-\sqrt{(1-K)(1-\gamma_0)(1-\gamma_S)}\ e^{-\alpha_0 L}]^2 + 4\sqrt{(1-K)(1-\gamma_0)(1-\gamma_S)}\ e^{-\alpha_0 L}\sin^2(\pi n f_{\frac{1}{2},q}L/c)} = \frac{1}{2} \times \tag{21}$$

$$\left[\frac{K(1-\gamma_0)(1-\gamma_S)e^{-2\alpha_0 L}}{[1-\sqrt{(1-K)(1-\gamma_0)(1-\gamma_S)}\ e^{-\alpha_0 L}]^2}\right]$$

and therefore $$\sin(\pi n f_{\frac{1}{2},q} L/c) = \pm \left[ \frac{1 - \sqrt{(1-K)(1-\gamma_0)(1-\gamma_S)}\ e^{-\alpha_0 L}}{2[\sqrt{(1-K)(1-\gamma_0)(1-\gamma_S)}\ e^{-\alpha_0 L}]^{\frac{1}{2}}} \right] \quad (22)$$

The solution of $f_{\frac{1}{2},q}$ in Equation (22) is $$f_{\frac{1}{2},q} = \frac{c}{\pi n L} q\pi \pm \quad (23)$$

$$\sin^{-1}\left[ \frac{1 - \sqrt{(1-K)(1-\gamma_0)(1-\gamma_S)}\ e^{-\alpha_0 L}}{2[\sqrt{(1-K)(1-\gamma_0)(1-\gamma_S)}\ e^{-\alpha_0 L}]^{\frac{1}{2}}} \right]$$

Therefore, by using Equations (20) and (23), the linewidth $\Delta f_c$ is obtained as $$\Delta f_c = 2|f_q - f_{1/2,q}| \quad (24)$$

$$= \frac{2c}{\pi n L} \sin^{-1}\left[ \frac{1 - \sqrt{(1-K)(1-\gamma_0)(1-\gamma_S)}\ e^{-\alpha_0 L}}{2[\sqrt{(1-K)(1-\gamma_0)(1-\gamma_S)}\ e^{-\alpha_0 L}]^{1/2}} \right]$$

$$= \frac{2c}{\pi n L} \sin^{-1}\left[ \frac{1 - [(1-K)(1-\gamma_0)(1-\gamma_S)\ e^{-2\alpha_0 L}]^{1/2}}{2[(1-K)(1-\gamma_0)(1-\gamma_S)\ e^{-2\alpha_0 L}]^{1/4}} \right]$$

For a typical fiber cavity, $$\frac{1 - [(1-K)(1-\gamma_0)(1-\gamma_S)\ e^{-2\alpha_0 L}]^{1/2}}{[(1-K)(1-\gamma_0)(1-\gamma_S)\ e^{-2\alpha_0 L}]^{1/4}} << 1 \quad (25)$$

and $$e^{-2\alpha_0 L} \approx 1 \quad (26)$$

Therefore, an approximation of the above equation is:

$$\Delta f_c \approx \frac{c}{n\pi L} \frac{1 - [(1-K)(1-\gamma_0)(1-\gamma_S)]^{1/2}}{[(1-K)(1-\gamma_0)(1-\gamma_S)]^{1/4}} \quad (27)$$

Therefore, $$\Delta f_c \propto \frac{1}{L} \propto \frac{1}{N+M} \quad (28)$$

From Equation (2), $$S = \frac{4A}{n\lambda L}$$

Since A is the effective sensing area of the gyroscope, $$A = N\pi R^2 \quad (29)$$

where R is the coil radius, and $$L = (N+M)2\pi R \quad (30)$$

it follows that $$S = \frac{2R}{n\lambda} \times \frac{N}{N+M} \quad (31)$$

and thus:

$$S \propto \frac{N}{N+M}$$

It can thus be observed that with the present invention, the scale factor S is smaller than that in existing BFOGs where M=0.

Thus, since $$\Omega_{MAX} = \frac{\sqrt{3}}{2}(\Delta f_c/S) \quad (32)$$

then $$\Omega_{MAX} \propto \frac{1}{\frac{N+M}{N}} \quad (33)$$

$$\Omega_{MAX} \propto \frac{1}{N}$$

As a result, the dynamic range of gyroscope rotation rate or maximum rotation rate of the gyro is inversely proportional to N. Thus, an increase in coil length due to the addition of the counter windings $+M/2$ and $-M/2$ does not affect the maximum rotation rate.

The second system parameter affected by an increase in coil length is the resolution of the gyro rotation rate measurement. The resolution of BFOG rotation rate measurement is governed by the formula:

$$\delta\Omega = \Delta f_{ST}/S \quad (34)$$

where $\Delta f_{ST}$ is the Schawlow-Townes linewidth and S is the scale factor.

Thus, the corresponding goal in BFOG system where coil length is increased is to keep the resolution of the rotation rate measurement as small as possible, or invariant, as a trade-off to holding the dynamic range of the gyroscope rotation rate invariant.

As described above, a larger $\Delta f_c$ provides a wider dynamic range of gyroscope rotation rate. However, it also implies that the cavity has a lower Q-value or quality factor. Since Q is a measure of the frequency selectivity of a resonant circuit, a lower Q-value results in a wider Brillouin laser linewidth and a poorer gyro resolution. This laser linewidth limit $\Delta f_{ST}$ expressed by:

$$\Delta f_{ST} = 2\pi h\nu \frac{(\Delta f_c)^2}{P_{S,out}} \quad (35)$$

where h is Planck's constant, $\nu$ is the light frequency, and $P_{S,out}$ is the Brillouin laser output power, expressed by the formula:

$$P_{S,out} = \alpha P_{S,out}^{(max)} \tag{36}$$

$$= \alpha K(1-\gamma_0)\frac{A_{eff}}{g_B L} \ln\left[\frac{1}{(1-K)(1-\gamma_0)(1-\gamma_S)e^{-2\alpha_0 L}}\right]$$

where $A_{eff}$ is the effective area of the fiber core, $g_B$ is the Brillouin gain coefficient and $\alpha$ is $0<\alpha<1$, where $\alpha$ is determined by the operation point in the first operating window.

Assuming negligible fiber attenuation loss, $$P_{S,out} \approx \alpha K(1-\gamma_0)\frac{A_{eff}}{g_B L} \ln\frac{1}{(1-K)(1-\gamma_0)(1-\gamma_S)} \tag{37}$$

Thus, $$P_{S,out} \propto \frac{1}{L} \propto \frac{1}{N+M}$$

From Equations (28) and (37), Equation (35) can be expressed as:

$$\Delta f_{ST} = \frac{2\pi h\nu \left(\frac{1}{N+M}\right)^2}{\frac{1}{N+M}} \propto \frac{1}{N+M} \tag{38}$$

Substituting Equations (38) and (31) into Equation (34) provides:

$$\delta\Omega \propto \frac{\frac{1}{N+M}}{\frac{N}{N+M}} \propto \frac{1}{N} \tag{39}$$

Thus, $\delta\Omega$ is invariant with the addition of the $+M/2$ CCW winding and the $-M/2$ CW windings.

The third system parameter affected by an increase in coil length is the relative lock-in range of the gyro caused by optical coupling between the counterpropagating waves which tends to pull the frequencies of these two Brillouin waves together. This phenomenon of frequency lock-in occurs when the gyro is rotating at low frequencies. When the frequency of these two counterpropagating lasing waves decreases to a point, typically less than 500 Hz, the two Brillouin waves are locked into one frequency. The range of frequencies within which this occurs is known as the "dead band." This effectively eliminates the beat-frequency which is crucial in determining the rotation rate of gyros. The absolute frequency lock-in range can be expressed as $$\Delta f_L = r(E_2/E_1) \tag{40}$$

where c is the light velocity; $E_1$ and $E_2$ represent the amplitudes of the two counterpropagating lasing waves, and r is the mutual coupling coefficient between the two amplitudes due to the scattering. Because the scattering in a fiber cavity is mainly contributed by the internal fiber splice and the fiber coupler, it can be assumed that increasing the optical fiber cavity length does not change the scattering strength r. Thus:

$$\Delta f_L \propto \frac{1}{L} \propto \frac{1}{N+M} \tag{41}$$

and the frequency lock in range is thus inversely proportional to the coil length.

The relative lock-in range is more meaningful as it provides the ratio of the lock-in range to the total operational range.

The relative lock-in range, $\Delta f_{L,rel}$ is expressed by:

$$\Delta f_{L,rel} = \frac{\Delta f_L}{S} \tag{42}$$

From Equations (31) and (41), Equation (42) can be written as:

$$\Delta f_{L,rel} \propto \frac{\frac{1}{N+M}}{\frac{N}{N+M}} \tag{43}$$

$$\propto \frac{1}{N}$$

Thus, the present invention leaves the relative lock-in range invariant.

The final system parameter of significance is the relative Kerr-effect-induced beat-frequency bias. The "resonant walk-off" effect described above also causes the two Brillouin waves in the cavity to have different circulating power levels when the gyro is rotating. This results in a beat-frequency bias through a phenomenon known as the "Kerr-effect." Basically, the refractive index for either Brillouin wave is perturbed by the presence of both Brillouin waves and both pump waves. The power imbalance between the Brillouin waves causes a differential index perturbation between the CW and CCW waves, and a beat-frequency bias, known as the Kerr-bias, occurs.

There are multiple thresholds for different orders of Brillouin lasing in a BFOG. As illustrated in FIG. 4, when the pump intensity reaches the first threshold for Brillouin scattering, the circulating pump power within the resonant cavity is pinned. Any additional pump input power above this pinned circulating pump power builds up as the first-order Brillouin circulating power. When this first-order Brillouin circulating power reaches the same level as the circulating pump power, a second-order Brillouin is generated. The window between the first Brillouin threshold and the second Brillouin threshold is referred to as the first operating window.

Since the Kerr-bias is proportional to the differential circulating power between the two Brillouin waves, it is proportional to the absolute Brillouin circulating power in the first window, $P_{S,cir}$.

The value of $P_{S,cir}$ is calculated as $$P_{S,cir} = \alpha P_{S,cir}^{(max)} = \alpha \frac{A_{eff}}{g_B L}\ln\frac{1}{(1-K)(1-\gamma_0)(1-\gamma_S)e^{-2\alpha_e L}} \tag{44}$$

$$\approx \alpha \frac{A_{eff}}{g_B L}\ln\frac{1}{(1-K)(1-\gamma_0)(1-\gamma_S)}$$

$$\propto \frac{1}{L} \propto \frac{1}{N+M}$$

It can thus be seen that the absolute Kerr bias is inversely proportional to the coil length.

The relative Kerr-bias will be more meaningful as it provides the extent of the bias as compared to the total beat-frequency range.

Since $$\frac{P_{S,cir}}{S} \propto \frac{\frac{1}{N+M}}{\frac{N}{N+M}} \propto \frac{1}{N} \tag{45}$$

it can be seen that the relative or scaled Kerr-bias is proportional only to 1/N and is independent of M. Hence, an increase in coil length with the counterwindings $+M/2$ and $-M/2$ will not affect the relative Kerr-basis.

OPERATION OF THE PRESENT INVENTION

Referring now to FIG. 2, the cavity loop 14 comprises N turns 24 wound in a selected direction (in FIG. 2, the CCW direction), and M turns, half, i.e., M/2 turns 26, of which are wound in the same direction as the N turns 24 (in FIG. 2, in the CCW direction), and the other half, i.e., M/2 turns 28, are wound in a direction counter to that of the N turns 24 (in FIG. 2, in a CW direction). The same effect will be obtained if the M/2 turns 26 are wound in one direction opposite to N, and the $-M/2$ turns 28 are wound in the same direction as N.

By providing the M/2 windings 26 in the same direction as the N turns 24, which, in FIG. 2 are in the CCW direction, any additional Sagnac effect resulting from this increase is offset by the counterwound M/2 windings 28.

The BFOG of the present invention thus decreases the input pump power of the BFOG without affecting the performance or response of other system parameters.

Although this invention has been described in terms of a certain preferred embodiment, other embodiments apparent to those of ordinary skill in the art are also within the scope of this invention. Accordingly, the scope of the invention is intended to be limited by the following appended claims.

What is claimed is:

1. A fiber optic coil for a Brillouin fiber optic Sagnac effect sensor that receives counterpropagating pump signals and that generates counterpropagating Brillouin signals in response to said counterpropagating pump signals, said coil having both clockwise and counterclockwise windings, said clockwise and counterclockwise windings being thus arranged to cause partial cancellation of the Sagnac effect on said counterpropagating Brillouin signals propagating through said coil, the number of said clockwise windings being different from the number of said counterclockwise windings so that the Sagnac effect is not completely canceled, whereby said Brillouin signals propagating through said coil are responsive to the Sagnac effect in proportion to the difference between the number of clockwise windings and the number of counterclockwise windings and whereby said clockwise and counterclockwise windings provide a cumulative effect on the generation of said counterpropagating Brillouin light signals said counterpropagating pump signals.

2. A method of operating a Sagnac effect gyroscope having a fiber optic coil sized to form a resonant cavity, said method comprising:
   a. generating light in said coil by causing said fiber optic coil to optically resonant;
   b. utilizing the Sagnac effect to alter a characteristic of said light as said light propagates through the coil; and
   c. utilizing the Sagnac effect to oppositely alter said characteristic of said light as said light propagates through said coil, such that a portion of the alteration in step (b) is canceled.

3. The method of claim 2, wherein said propagating step comprises propagating light in both directions through said coil, said method additionally comprising the step of rotating said coil to provide a frequency difference between said counter propagating waves.

4. The method of claim 3, wherein said propagating step comprises propagating light having an intensity sufficient to produce Brillouin scattering in said fiber optic coil.

5. The method of claim 3, wherein said coil comprises a first plurality of turns of optical fiber wound in a first direction and a second plurality of turns of optical fiber wound in a second direction, said second plurality being a different number from said first plurality such that the Sagnac effect is partially canceled.

6. In a Brillouin fiber optic sensor having a detector, a loop of optical fiber configured for exposure to an ambient effect along substantially the entire length of said loop, and a pump light source coupled to introduce counterpropagating pump light to said loop, said pump light waves pumping said fiber to generate a pair of counterpropagating Brillouin waves for sensing said ambient effect, said Brillouin waves combined to form an output signal which varies in response to said ambient effect, said detector detecting said output signal, a method of reducing pump power requirements for said sensor, said method comprising:
   a. determining a first loop length which will provide a desired response of said output signal to said ambient effect;
   b. utilizing a fiber having a second loop length longer than said first loop length determined in step (a) to permit said Brillouin waves to be generated at reduced pump power; and
   c. configuring the fiber utilized in step (b) to provide a response at said reduced pump power, said response at said reduced pump power being substantially the same as said desired response.

7. The Brillouin fiber optic sensor as defined in claim 6, wherein said ambient effect is rotation.

8. The Brillouin fiber optic sensor as defined in claim 6, wherein said system response of said output signal corresponds to a dynamic range of gyroscope rotation rate.

9. The Brillouin fiber optic sensor as defined in claim 6, wherein said system response of said output signal corresponds to a resolution of gyroscope rotation rate measurement.

10. The Brillouin fiber optic sensor as defined in claim 6, wherein said system response corresponds to a relative lock-in range.

11. The Brillouin fiber optic sensor as defined in claim 6, wherein said system response corresponds to a relative Kerr-effect-induced beat-frequency bias.

12. The Brillouin fiber optic sensor as defined in claim 6, wherein said configuring step comprises winding said fiber in a loop comprising:
- a first plurality of turns of said fiber having said first length wound in a first direction to provide said desired system response; and
- a second plurality of turns and a third plurality of turns having a total length equal to a difference between said first loop length and said second loop length, one of said second and third plurality of turns wound in said first direction, the other of said second and third plurality of turns wound in a second direction opposite said first direction to suppress changes in said desired response.

13. A Brillouin fiber optic gyroscope comprising:
- a pump source that generates pump light;
- a first length of an optical fiber wound in a first direction to provide a first plurality of turns of a loop formed as a Brillouin laser cavity, said optical fiber receiving said pump light as a pair of counterpropagating pump signals in said loop, said counterpropagating pump signals causing a pair of laser light signals to be generated within the loop as a result of the Brillouin scattering;
- a detector that detects a portion of the Brillouin laser light signals that exit from said loop, said Brillouin laser light signals having a frequency difference in accordance with the Sagnac effect caused by rotation of said loop, said gyroscope having a system response which includes a dynamic range of gyroscopic rotation rate, a resolution of gyroscope rotation rate measurement, a relative lock-in range, and a relative Kerr-effect-induced beat-frequency bias associated with said rotation of said loop determined by said first length of fiber; and
- a second length of said optical fiber formed in said loop to increase the length of said optical fiber in said loop to thereby reduce the power required from said pump source to generate said Brillouin laser light signals, said second length of fiber comprising a second plurality of turns wound in said first direction and a third plurality of turns wound in a second direction opposite said first direction, thereby maintaining said dynamic range, said resolution, said relative lock-in range and said relative Kerr-effect-induced beat-frequency bias substantially the same as determined by said first length of fiber.

14. The Brillouin fiber optic gyroscope as defined in claim 13, wherein said second plurality of turns and said third plurality of turns are substantially equal.

15. A method of winding a loop to reduce the pump power requirements for a Brillouin optical fiber gyroscope, comprising the steps of:
- winding a first plurality of turns of an optical fiber in a first direction to form said loop and to establish a desired system response which includes a dynamic range of gyroscope rotation rate, a resolution of gyroscope rotation rate measurement, a relative lock-in range, and a relative Kerr-effect-induced beat-frequency bias for said gyroscope in accordance with a Sagnac effect formed by said first plurality of turns;
- winding a second plurality of turns of said optical fiber in said first direction to increase the length of said optical fiber in said loop and to thereby reduce the pump power requirements for generating Brillouin laser light in said loop, said second plurality of turns further increasing the Sagnac effect within said loop; and
- winding a third plurality of turns of said optical fiber in a second direction opposite said first direction to further increase the length of said optical fiber in said loop and to thereby further reduce the pump power requirements for generating Brillouin laser light in said loop, said third plurality of turns of said optical fiber having the further effect of at least partially canceling out the increase in the Sagnac effect within said loop caused by said second plurality of turns, thereby suppressing any changes in the system response of said gyroscope.

16. A method of winding a Sagnac loop to reduce the pump power requirements for a Brillouin optical fiber gyroscope, comprising the steps of:
- winding a first plurality of turns of an optical fiber in a first direction to form said loop and to establish a desired system response for said gyroscope which includes the dynamic range of the gyroscope rotation rate, the resolution of the rotation rate measurement, the relative lock-in range and the relative Kerr-effect-induced beat-frequency bias, in accordance with a Sagnac effect within said loop encompassed by said first plurality of turns; and
- winding a second plurality of turns of said optical fiber in said first direction and a third plurality of turns of said optical fiber in a second direction opposite said first direction to increase the length of said optical fiber in said loop and to thereby reduce the pump power requirements for generating Brillouin laser light in said loop without increasing the Sagnac effect within said loop and without substantially affecting said desired system response.

* * * * *